(12) United States Patent
Wallmeier (10) Patent No.: US 12,463,542 B2
(45) Date of Patent: Nov. 4, 2025

(54) DC/DC-CONVERTER USING MULTILEVEL TECHNOLOGY

(71) Applicant: Delta Electronics (Thailand) Public Co., Ltd., Samutprakarn (TH)

(72) Inventor: Peter Wallmeier, Samutprakarn (TH)

(73) Assignee: Delta Electronics (Thailand) Public Co., Ltd., Samutprakarn (TH)

( * ) Notice: Subject to any disclaimer, the term of this patent is extended or adjusted under 35 U.S.C. 154(b) by 260 days.

(21) Appl. No.: 18/183,181

(22) Filed: Mar. 14, 2023

(65) Prior Publication Data

US 2023/0291320 A1 Sep. 14, 2023

(30) Foreign Application Priority Data

Mar. 14, 2022 (EP) .................................... 22161979

(51) Int. Cl.
*H02M 3/335* (2006.01)
*H02M 1/00* (2006.01)
(Continued)

(52) U.S. Cl.
CPC ..... *H02M 3/33573* (2021.05); *H02M 1/0054* (2021.05); *H02M 1/14* (2013.01);
(Continued)

(58) Field of Classification Search
CPC ............... H02M 3/33573; H02M 3/01; H02M 3/33576; H02M 7/4837; H02M 1/0054;
(Continued)

(56) References Cited

U.S. PATENT DOCUMENTS 11,063,528 B2 * 7/2021 Yoscovich .............. H02M 7/42
11,088,625 B1 * 8/2021 Cao .................... H02M 3/33584
(Continued)

OTHER PUBLICATIONS

Rimon Gadelrab et al., "Three-Phase Interleaved LLC Resonant Converter with Integrated Planar Magnetics for Telecom and Server Application", pp. 512-519, published in 2020 IEEE Applied Power Electronics Conference and Exposition (Apec), IEEE, Mar. 15, 2020.
(Continued)

*Primary Examiner* — Yusef A Ahmed
(74) *Attorney, Agent, or Firm* — CKC & Partners Co., LLC (57) ABSTRACT

A DC/DC-Converter, including a transformer that includes a primary side which includes n primary coils and a secondary side which includes n secondary coils, wherein the primary side is terminated by n primary capacitors, which are connected in a first polygon arrangement, each primary capacitor connecting two of the primary coils. The first converter circuit is connected in between primary side of the transformer and two primary side contacts, and includes a first multilevel converter configured to work as a inverter when the DC/DC-converter is used in a forward mode, a second converter circuit connected in between the secondary side of the transformer and two secondary side contacts and is configured to work as a rectifier when the DC/DC-converter is used in a forward mode; and a control circuit configured to control the first multilevel converter of the first converter circuit to work as the inverter in the forward mode.

10 Claims, 7 Drawing Sheets

(51) Int. Cl.
H02M 1/14 (2006.01)
H02M 3/00 (2006.01)
H02M 7/483 (2007.01)
H02M 7/487 (2007.01)

(52) U.S. Cl.
CPC ......... *H02M 3/01* (2021.05); *H02M 3/33569* (2013.01); *H02M 3/33576* (2013.01); *H02M 3/33584* (2013.01); *H02M 7/4837* (2021.05); H02M 7/487 (2013.01)

(58) Field of Classification Search
CPC ............. H02M 7/487; H02M 3/33584; H02M 3/33569; H02M 1/14
See application file for complete search history.

(56) References Cited

U.S. PATENT DOCUMENTS

| | | | | |
|---|---|---|---|---|
| 11,404,966 | B2* | 8/2022 | Kim | H02M 1/0064 |
| 11,894,766 | B2* | 2/2024 | Li | H02M 3/33569 |
| 12,149,178 | B2* | 11/2024 | Drofenik | H02M 3/01 |
| 2006/0062034 | A1* | 3/2006 | Mazumder | H02M 7/4807 |
| | | | | 363/131 |
| 2007/0230226 | A1* | 10/2007 | Lai | H02M 7/487 |
| | | | | 363/65 |
| 2009/0195068 | A1* | 8/2009 | Ohashi | H03K 17/162 |
| | | | | 307/18 |
| 2013/0201725 | A1* | 8/2013 | Boysen | H02M 3/24 |
| | | | | 336/10 |
| 2015/0009734 | A1* | 1/2015 | Stahl | H02M 7/53871 |
| | | | | 363/98 |
| 2015/0180350 | A1* | 6/2015 | Huang | H02M 3/33584 |
| | | | | 307/66 |
| 2015/0249403 | A1* | 9/2015 | Sato | H02M 7/4837 |
| | | | | 363/127 |
| 2016/0254756 | A1* | 9/2016 | Yang | H01F 27/2823 |
| | | | | 363/21.02 |
| 2017/0237339 | A1* | 8/2017 | Young | H02M 1/38 |
| | | | | 363/126 |
| 2018/0152112 | A1* | 5/2018 | Torrico-Bascopé | |
| | | | | H02M 3/33584 |
| 2018/0198373 | A1* | 7/2018 | Torrico-Bascopé | H02M 1/083 |
| 2019/0058416 | A1* | 2/2019 | Wang | H02M 7/48 |
| 2019/0355506 | A1* | 11/2019 | Fei | H01F 27/2804 |
| 2019/0379291 | A1* | 12/2019 | Xue | H02M 7/219 |
| 2019/0379292 | A1* | 12/2019 | Fei | H01F 3/14 |
| 2020/0321878 | A1* | 10/2020 | Zhang | H02M 7/4811 |
| 2021/0067048 | A1* | 3/2021 | Zhang | H02M 3/01 |
| 2021/0099097 | A1* | 4/2021 | Zhang | G01R 15/18 |
| 2021/0126550 | A1* | 4/2021 | Yenduri | H02M 5/4585 |
| 2021/0135567 | A1* | 5/2021 | Zhang | H02M 7/4837 |
| 2021/0155100 | A1* | 5/2021 | Khaligh | B60L 55/00 |
| 2021/0408927 | A1* | 12/2021 | Zhang | H02M 3/01 |
| 2022/0014099 | A1* | 1/2022 | Kim | H02M 3/01 |
| 2022/0109381 | A1* | 4/2022 | Yenduri | H02M 7/4807 |
| 2022/0190712 | A1* | 6/2022 | Chen | H02M 1/4225 |
| 2022/0224236 | A1* | 7/2022 | Elshaer | H02M 3/33584 |
| 2022/0286049 | A1* | 9/2022 | Fujii | H02M 3/158 |
| 2023/0048596 | A1* | 2/2023 | Drofenik | H02M 3/33584 |
| 2023/0060063 | A1* | 2/2023 | Schweizer | H02M 1/0058 |
| 2023/0268844 | A1* | 8/2023 | Menzi | H02M 7/483 |
| | | | | 363/13 |
| 2023/0336070 | A1* | 10/2023 | Wijekoon | H02M 1/0054 |

OTHER PUBLICATIONS

Juan Ignacio Nuñez et al., "Three-phase CLLLC Resonant Converters", pp. 1-6, published in 2021 IEEE 15th International Conference on Compatibility, Power Electronics and Power Engineering (Cpe-Powereng), IEEE, Jul. 14, 2021.
Corresponding extended European search report issued on Aug. 22, 2022.

* cited by examiner

DC/DC-CONVERTER USING MULTILEVEL TECHNOLOGY

CROSS-REFERENCE TO RELATED APPLICATIONS

This application claims priority to European Patent Application No. 22161979.4, filed on Mar. 14, 2022, and entitled "DC/DC-Converter using multilevel technology", the content of which is hereby incorporated by reference in its entirety.

TECHNICAL FIELD

The application concerns a DC/DC-converter.

BACKGROUND

DC/DC-converters that are known in the art are commonly 3-phase direct current converters. Such DC/DC-converters often use 2-level half bridges.

SUMMARY

The object of the present application is to provide a DC/DC-converter having improved switching characteristics. The use of multilevel technology allows the utilization of lower breakdown voltage semiconductors with much better figure of merit (RdsonxQ) and result in lower losses at higher switching frequencies. Multiphase technology provides ripple cancellation at the output capacitor as the multiphase medium frequency provides 0 AC ripple and constant power flow from input to output compared to single phase technology. The phase legs are phase shifted to each other by 360°/Number of legs. The polygon connection of the resonance capacitors in the input stage provide lower current stress on the capacitors compared to a star connection.

This is achieved by a DC/DC-converter according to the application. The DC/DC-converter according to the application comprises a transformer that comprises a primary side and a secondary side, wherein the primary side comprises a number of n primary coils and the secondary side comprises a number of n secondary coils, wherein the primary side of the transformer is terminated by a number of n primary capacitors, which are connected in a first polygon arrangement, each of the primary capacitors connecting two of the primary coils, a first converter circuit that is connected in between the primary side of the transformer and two primary side contacts, the first converter circuit comprising a first multilevel converter, that is configured to work as a inverter when the DC/DC-converter is used in a forward mode, wherein the first multilevel converter is configured to receive a DC input current that is provided to the primary side contacts and to provide n-phases of an alternating current to the n primary coils of the transformer, respectively, a second converter circuit that is connected in between the secondary side of the transformer and two secondary side contacts and is configured to work as a rectifier when the DC/DC-converter is used in a forward mode, wherein the second converter circuit is configured to receive an alternating current from each of the n secondary coils of the transformer, and to provide a DC output current to the secondary side contacts, and a control circuit that is configured to control the first multilevel converter of the first converter circuit to work as the inverter in the forward mode.

The electronic components of the DC/DC-converter are to be understood as functional entities. In particular, the primary coils, the secondary coils and the primary capacitors, as well as the legs of the multilevel converters, the secondary capacitors and the resonance inductances that are described in the following, are to be understood as functional entities. In particular, a serial or parallel connection of multiple components that is designed to provide the functionality of one component is a functional entity. For example, the term primary capacitor is also referring to two capacitors that are connected in parallel to provide the behaviour of a single capacitor with larger capacity.

The DC/DC-converter is capable to work in a forward mode. In the forward mode, the primary side contacts serve as input ports for receiving a DC current having a first voltage that is to be converted by the DC/DC converter to a second voltage. Accordingly, in the forward mode, the secondary side contacts serve as output ports for providing the DC current with the second voltage. The fact that the DC/DC-converter is capable to work in a forward mode does not necessarily imply that the DC/DC-converter is also capable to work in any other mode than the forward mode, although the DC/DC-converter may also be capable to work in a backward mode.

The first converter circuit comprises a first multilevel converter. A multilevel converter is a DC/AC-converter that is capable to provide an alternating current having multiple voltage levels, that is more than two different voltage levels per output port. Therefore, an alternating voltage having a specific phase can be provided per output port of the multilevel converter. The phases on the different output ports of the multilevel converter are shifted, such that the multilevel converter is configured to provide n-phases of an alternating current. The different alternating currents having the different phases are provided to different ones of the n-primary coils. Therefore, a rotating current can be provided to the primary side of the transformer.

The side of the primary coils that is not connected to the first converter circuit is terminated by a first polygon arrangement. The first polygon arrangement is for providing DC-Decoupling. The first polygon arrangement is a first resonance capacitor circuit. In an implementation, the DC/DC-converter further comprises a first resonance inductor circuit, which is connected to the primary coils on the side that is connected to the first converter circuit. The combination of the first resonance capacitor circuit and the first resonance inductor circuit is forming a first resonance circuit, which is providing a resonance for DC-Decoupling. Thus, the first polygon arrangement is part of a serial resonance circuit.

The second converter circuit is configured to provide the functionality of a rectifier in the forward mode. Thus, an AC/DC-converter is provided by the second converter circuit. In case the DC/DC-converter is not capable to work in any other mode than the forward mode, the second converter circuit can be a passive circuit that is not controlled by any control circuit. However, it is advantageous that the second converter circuit is an active rectifier comprising n legs and being controlled by the control circuit. The control circuit is configured to control the first converter circuit to work as the multilevel converter.

The dependent claims define some embodiments of the application.

In an implementation, the first multilevel converter is a flying capacitor multilevel converter. Flying capacitor multilevel converters, also called flying cap converters, comprise multiple serial transistors for stepwise switching the input voltage that is provided to the primary side contacts. That is, the voltage that is provided on the primary coils is stepwise increased with a subsequent switching of the serial transistors. To achieve the stepwise increase, it is necessary that an additional voltage is supplied. However, as an additional voltage source is not desirable, flying cap converters are utilizing a capacitor to provide an additional voltage supply in between the serial transistors. The capacitor is charged in the switching process via the input voltage that is provided to the primary side contacts. The control circuit is configured to control the first converter circuit to work as the flying capacitor multilevel converter.

In an implementation, the number of n is larger than three. That is, the DC/DC-Converter can be designed to work with transformers that have an arbitrary number of separate coils. A required power can be supplied via a high number of primary and secondary coils, which leads low losses. In particular, the number of n is equal to one of the values four, five or six. In the alternative, the number of n is equal to a value of three.

In an implementation, the first polygon arrangement is a closed ring circuit in which the n primary capacitors are connected in series. This leads to an increased reliability of the first polygon arrangement and of the DC/DC-converter, as the termination of the primary coils can be still provided, even if one of the primary capacitors fails.

In an implementation, the secondary side of the transformer is terminated by a number of n secondary capacitors, which are connected in a second polygon arrangement, each of the capacitors connecting two of the secondary coils. For the specific case that the transformer has three secondary coils, the polygon arrangement is a delta connection. In particular, each capacitor is connected to exact two output sides of two different primary coils such that all capacitors are connected to a different set of two primary coils. To achieve such a connection, the capacitors are serially connected in a ring circuit. That is, each capacitor is connected to one preceding capacitor and to one following capacitor in the ring. Between each pair of subsequent capacitors, there is one primary coil connected. In an implementation, the side of the secondary coils that is not connected to the second converter circuit is terminated by a second polygon arrangement. The second polygon arrangement is for providing DC-Decoupling. The second polygon arrangement is a second resonance capacitor circuit. In an implementation, the DC/DC-converter further comprises a second resonance inductor circuit, which is connected to the second coils on the side that is connected to the second converter circuit. The combination of the second resonance capacitor circuit and the second resonance inductor circuit is forming a second resonance circuit, which is providing a resonance for DC-Decoupling. Thus, the second polygon arrangement is part of a serial resonance circuit.

In an implementation, the second polygon arrangement is a closed ring circuit in which the n secondary capacitors are connected in series. This leads to an increased reliability of the second polygon arrangement and of the DC/DC-converter, as the termination of the secondary coils can be still provided, even if one of the primary capacitors fails.

In an implementation, the control circuit is configured to selectively control the first converter circuit to work as the inverter and to control the second converter circuit to work as a rectifier in the forward mode, and control the first converter circuit to work as a rectifier and to control the second converter circuit to work as an inverter in a backward mode. The control circuit is capable to control the DC/DC-Converter to work in the forward mode or in the backward mode. Therefore, it can be controlled whether a current should be provided from the primary side contacts to the secondary side contacts in the forward mode or from the secondary side contacts to the primary side contacts in the backward mode. For example, the DC/DC-Converter can be connected between a load/charging circuit and a battery, wherein the load/charging circuit is connected to the primary side contacts and a battery is connected to the secondary side contacts. In case that the battery is to be charged, a voltage can be supplied to the battery in the forward mode. In case that the battery should be used to supply the load/charging circuit, a voltage can be supplied from the battery in the backward mode. In the alternative, an opposite configuration with inverted functionality can be provided in which the load/charging circuit is connected to the secondary side contacts and a battery is connected to the primary side contacts.

In an implementation, the first multilevel converter of the first converter circuit is further configured to work as a rectifier when the DC/DC-converter is used in a backward mode, wherein the first multilevel converter is configured to receive an alternating current from each the n primary coils of the transformer and to provide a DC output current to the primary side contacts, the second converter circuit is configured to work as a inverter when the DC/DC-converter is used in a backward mode, wherein the second converter circuit is configured to receive a DC input current from the secondary side contacts and to provide an alternating current to the n secondary coils of the transformer, respectively. The first multilevel converter of the first converter circuit is further configured to work as a rectifier. For such operation, no additional transistors are required, as also a multilevel converter can be controlled to work as a rectifier.

In an implementation, the first multilevel converter comprises a number of n legs, each leg connecting the primary side contacts and connected to one of the primary coils, wherein each of the legs comprises a number of $2*m$ electrical switches being connected in series, wherein a number of m electrical switches are provided between the respective primary coil and each one of the primary side contacts, wherein the number of m is two, or may be larger than two, or may be larger than three. More specifically, it is advantageous to choose the number of m to be three, four or five. In an implementation, the electrical switches are transistors. Due to the number of electrical switches within each leg, switching losses at the electrical switches can be minimized, as switching losses typically appear when switching high currents or voltages.

In an implementation, each leg of the first multilevel converter comprises a first half-leg and a second half-leg, wherein a number of m of the electrical switches is connected in series in each half-leg, wherein the first half-leg and the second half-leg is connected by one or more bridges, each bridge comprising a multilevel capacitor, wherein one side of the bridge is connected in between two subsequent electrical switches of the first half-leg and the other side of the bridge is connected in between two corresponding subsequent electrical switches of the second half-leg. In other words, each leg comprises a multilevel capacitor that is arranged to form a flying capacitor multilevel converter. Corresponding subsequent electrical switches in the second half-leg are the switches that have the same number of switches in between itself and the primary coil or the nearest primary side contact. In an implementation, each leg comprises a number of $m-1$ bridges and/or a number of $m-1$ multilevel capacitors.

In an implementation, each of the legs of the first multilevel converter is capable to provide different voltage levels to the respective primary coil for providing the alternating current in the forward mode. Therefore, the alternating current that is supplied to the primary coils can be shaped in a curve, reducing losses that occur during changes in the voltage. In the backward mode, each of the legs of the first multilevel converter may also be capable to receive and rectify an alternating current from a respective primary coil and to provide a DC current to the primary side contacts.

In an implementation, the second converter circuit comprises a second multilevel converter, wherein the second multilevel converter is in particular a flying capacitor multilevel converter. This is advantageous to provide high signal quality and low losses, independently on whether the DC/DC-converter is working in forward mode or backward mode.

All design options that are disclosed for the first converter circuit can also be applied to the second converter circuit.

In an implementation, the second multilevel converter comprises a number of n legs, each leg connecting the secondary side contacts and connected to one of the secondary coils, wherein each of the legs comprises a number of 2*i electrical switches being connected in series, wherein a number of i electrical switches are provided between the respective secondary coil and each one of the secondary side contacts (9a, 9b), wherein the number of i is two, or may be larger than two, or may be larger than three. It is further preferable to use identical numbers of electrical switches per leg in the second multilevel converter as in the first multilevel converter, which implies that m equals i (m=i). The first converter circuit and the second converter circuit can have a corresponding or different circuit layout. For example, the first converter circuit and the second converter circuit can comprise a different number of electrical switches per leg.

In an implementation, each of the legs is capable to rectify an alternating current that is received from the respective secondary coil for providing the alternating current at the secondary side contacts in the forward mode. In the backward mode, it is preferable that each of the legs of the second multilevel converter is capable to provide different voltage levels to the respective secondary coil for providing the alternating current.

In an implementation, a resonance inductor circuit is connected in between the primary coils and the first converter circuit and/or in between the secondary coils and the second converter circuit. In particular, a first inductor circuit is connected in between the primary coils and the first converter circuit, such a first inductor circuit is capable to provide a resonance circuit on the primary side of the transformer in combination with the first resonance capacitor circuit, which comprises the first polygon arrangement. In addition or in the alternative, a second inductor circuit is connected in between the secondary coils and the second converter circuit, such a second inductor circuit is capable to provide a resonance circuit on the secondary side of the transformer in combination with the second resonance capacitor circuit, which comprises the second polygon arrangement.

BRIEF DESCRIPTION OF DRAWINGS

Embodiments of the application are described in more with reference to the accompanying drawings, wherein.

DESCRIPTION OF EMBODIMENTS

Figure 1:
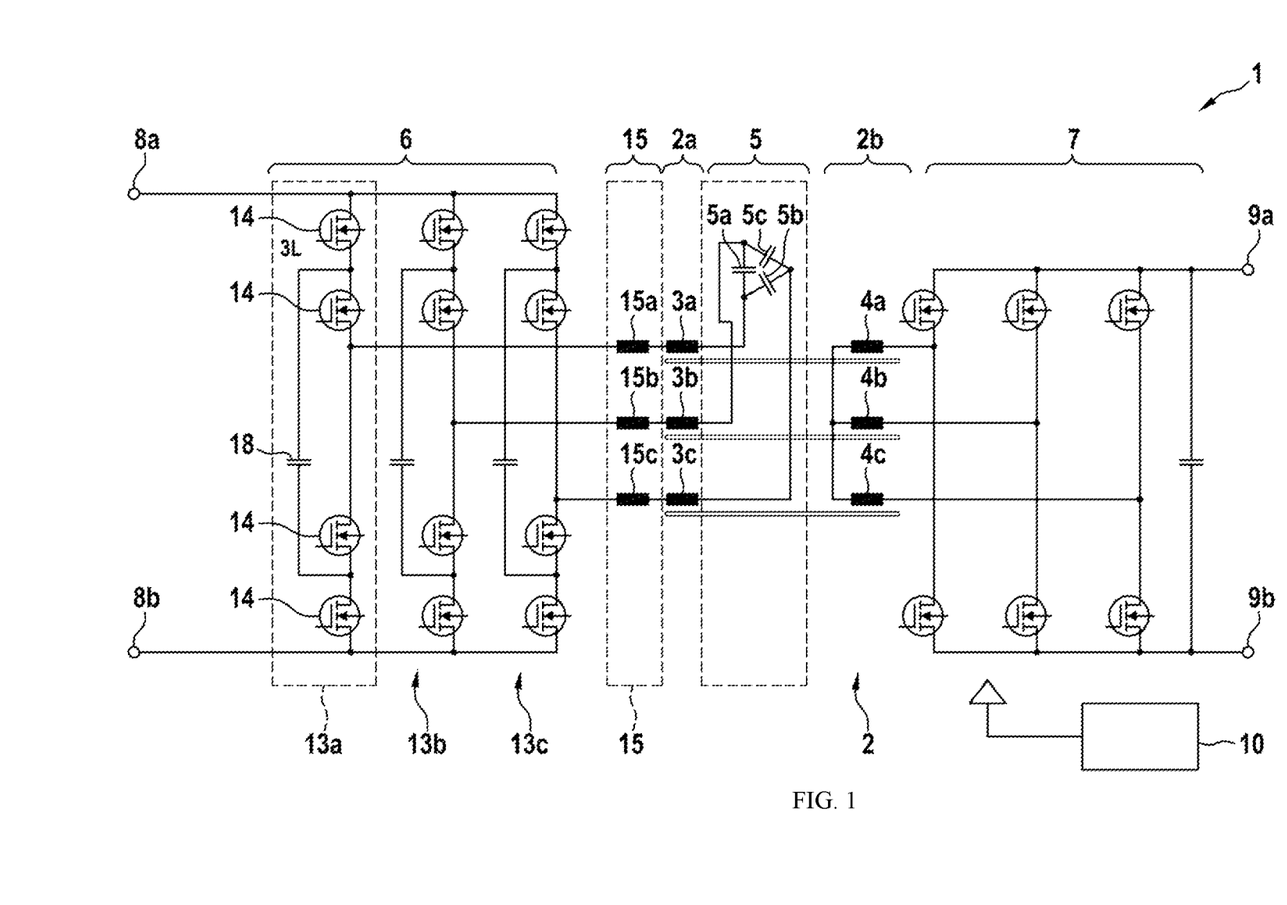
FIG. 1 discloses a DC/DC-converter according to a first embodiment of the application, FIG. 2 discloses a DC/DC-converter according to a second embodiment of the application, FIG. 3 discloses a DC/DC-converter according to a third embodiment of the application, FIG. 4 discloses a DC/DC-converter according to a fourth embodiment of the application, FIG. 5 discloses a DC/DC-converter according to a fifth embodiment of the application, FIG. 6 discloses a DC/DC-converter according to a sixth embodiment of the application, and FIG. 7 discloses alternative designs for a leg of a flying capacitor multilevel converter.

FIG. 1 discloses a DC/DC-converter 1 according to a first embodiment of the application. The DC/DC-converter 1 comprises a transformer 2, a first converter circuit 6, a second converter circuit 7, a first resonance inductor circuit 15 and a control circuit 10. According to this first embodiment of the application, the DC/DC-converter 1 is designed for always working in a forward mode.

The transformer 2 comprises three primary coils 3a, 3b, 3c, which are provided on a primary side 2a of the transformer 2, and three secondary coils 4a, 4b, 4c, which are provided on a secondary side 2b of the transformer 2. Therefore, the transformer 2 comprises a number of n=3 primary coils 3a, 3b, 3c and secondary coils 4a, 4b, 4c. The three primary coils 3a, 3b, 3c comprise a first primary coil 3a, a second primary coil 3b and a third primary coil 3c. The three secondary coils 4a, 4b, 4c comprise a first secondary coil 4a, a second secondary coil 4b and a third secondary coil 4c. The primary coils 3a, 3b, 3c are connected to the secondary coils 4a, 4b, 4c by a core of the transformer 2.

Each one of the primary coils 3a, 3b, 3c is connected to the first converter circuit 6 via the first resonance inductor circuit 15. The first resonance inductor circuit 15 comprises a first resonance inductance 15a, a second resonance inductance 15b and a third resonance inductance 15c.

The first converter circuit 6 is a flying capacitor multilevel converter and is working as a DC/AC-converter in the forward mode. The first converter circuit 6 comprises two primary side contacts 8a, 8b, comprising a first primary side contact 8a and a second primary side contact 8b. In the forward mode, the first converter circuit 6 is configured to receive a DC current on the two primary side contacts 8a, 8b and to convert the DC current into an alternating current having three phases. The first converter circuit 6 and therefore the flying capacitor multilevel converter comprises three legs 13a, 13b, 13c, wherein each leg is for creating one phase of the three phases of the alternating current. The first leg 13a is connected to the first resonance inductance 15a. Thus, the first phase of the alternating current is provided to the first primary coil 3a via the first resonance inductance 15a. The second leg 13b is connected to the second resonance inductance 15b. Thus, the second phase of the alternating current is provided to the second primary coil 3b via the second resonance inductance 15b. The third leg 13c is connected to the third resonance inductance 15c. Thus, the third phase of the alternating current is provided to the third primary coil 3c via the third resonance inductance 15c.

The primary side 2a of the transformer 2 is terminated by a number of three primary capacitors 5a, 5b, 5c, which are connected in a first polygon arrangement 5. The first polygon arrangement 5 is a first resonance capacitor circuit. The first polygon arrangement 5 is a closed ring circuit in which the three primary capacitors 5a, 5b, 5c are connected in series. The first primary capacitor 5a has one side that is connected to the first primary coil 3a and another side that is connected to the second primary coil 3b. The second primary capacitor 5b has one side that is connected to the first primary coil 3a and another side that is connected to the third primary coil 3c. The third primary capacitor 5c has one side that is connected to the second primary coil 3b and another side that is connected to the third primary coil 3c. accordingly, the output side of each one of the primary capacitors 5a, 5b, 5c is connected to an input side of a following one of the primary capacitors 5a, 5b, 5c, such that all primary capacitors 5a, 5b, 5c are connected to a polygon shape. According the first embodiment, the first polygon arrangement is a delta connection of the primary capacitors 5a, 5b, 5c. The primary capacitors 5a, 5b, 5c of the first polygon arrangement 5, as a first resonance capacitor circuit, is forming a resonance circuit in combination with the resonance inductances 15a, 15b, 15c of the first resonance inductor circuit 15.

Figure 7:
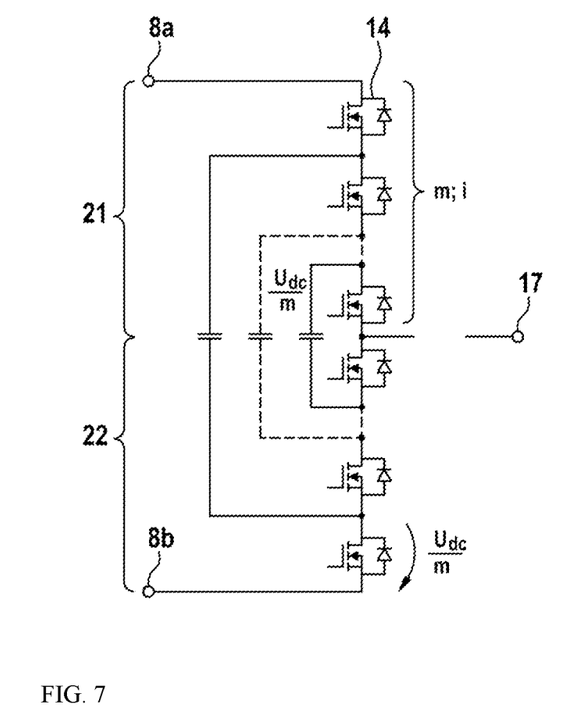

The flying capacitor multilevel converter comprises the three legs 13a, 13b, 13c, each leg for generating one phase of the alternating current that is provided to the primary coils 3a, 3b, 3c. The first leg 13a is also depicted in FIG. 7. A central point 17 of the first leg is connected to the first resonance inductor circuit 15, in particular to the first resonance inductance 15a. The central point 17 is connected via two serially connected transistors 14, that is a first transistor 14a and a second transistor 14b, to the first primary side contact 8a. The central point 17 is further connected via two serially connected transistors 14, that is a third transistor 14c and a four transistor 14d, to the second primary side contact 8b. The transistors are all connected in series in between the first primary side contact 8a and the second primary side contact 8b, wherein the switchable contacts of the transistors 14 are used for the serial connection. A bridge comprising a multilevel capacitor 18 is connected on one side in between the first transistor 14a and the second transistor 14b and is connected on the other side in between the third transistor 14c and the fourth transistor 14d. The transistors 14 can be switched as commonly performed in flying capacitor multilevel converters, wherein the switching process is controlled by the control circuit 10. The second leg 13b and the third leg 13c have the same layout as the first leg 13a. With this layout, an alternating current with three phases can be generated. The control circuit 10 can utilize any known switching scheme for switching the transistors 14 of the flying capacitor multilevel converter. Such switching scheme is to be selected to ensure that corresponding capacitors in the same leg 13a, 13b, 13c are not switched on at the same time. For example, referring to the exemplary first leg 13a as depicted in FIG. 7, it is to be avoided that the first transistor 14a is switch on simultaneously with the fourth transistor 14d and that that the second transistor 14b is switch on simultaneously with the third transistor 14c.

Depending on the switching status of the transistors 14, either the voltage that is applied to the first primary side contact 8a, the voltage that is applied to the second primary side contact 8b or a voltage that is half a voltage difference between the voltage of the first primary side contact 8a and the second primary side contact 8b can be switched to the central point 17. This way, the voltage drop over each transistor 14 is reduced and different voltage levels can be provided to the connected primary coil.

In alternative designs, each leg 13a, 13b, 13c comprises a higher number of transistors 14. This is depicted on the right side in FIG. 7. In the alternative designs, a number of m transistors is connected in between the central point 17 and each one of the primary side contact 8a, 8b. Further than that, additional bridges, each bridge comprising a multilevel capacitor 18, are provided. Each bridge comprises one side that is connected between two transistors 14 on the leg towards the first primary side contact 8a and one side that is connected between two transistors on the leg towards the second primary side contact 8b. Each bridge connecting a pair of transistors that has the same alignment in respect to the central point 17.

The first leg 13a, 13b 13c of the first multilevel converter comprises a first half-leg 21 and a second half-leg 22, as exemplary depicted in FIG. 7, wherein a number of m of the electrical switches, that is the transistors 14, is connected in series in each half-leg 21, 22. The first half-leg 21 and the second half-leg 22 are connected by one or more bridges 20, each bridge 20 comprising a multilevel capacitor 18, wherein one side of the bridge 20 is connected in between two subsequent electrical switches 14a, 14b of the first half-leg 21 and the other side of the bridge 20 is connected in between two corresponding subsequent transistors 14c, 14d of the second half-leg 22. The switching of the transistors 14 is controlled in a way that a voltage drop of $U_{dc}/m$ is achieved over each multilevel capacitor 18, wherein $U_{dc}$ is the voltage that is supplied to the primary side contacts 8a, 8b.

Therefore, the multilevel converter comprises a number of n legs 13a, 13b 13c, each leg connecting the primary side contacts 8a, 8b and connected to one of the primary coils 3a, 3b, 3c, wherein each of the legs 13a, 13b 13c comprises a number of 2*m transistors 14 being connected in series, wherein a number of m electrical switches are provided between the respective primary coil 3a, 3b, 3c and each one of the primary side contacts 8a, 8b, wherein the number of m is either equal to two (m=2), as shown in FIG. 1, or the number of m is larger than two (m>2), as shown on the right side in FIG. 7.

In all embodiments, each of the legs 13a, 13b 13c is capable to provide different voltage levels to the respective primary coil 3a, 3b, 3c for providing the alternating current. However, the number of voltage levels is dependent on the number of transistors 14 that are connected in series per leg.

Referring back to FIG. 1, it is shown that the secondary coils 4a, 4b, 4c are connected to the second converter circuit 7. The second converter circuit 7 can be any type of rectifier. For example, as depicted in FIG. 1, the second converter circuit 7 can be an active rectifier. In this case, each one of the secondary coils 4a, 4b, 4c is connected via one transistor to a first secondary side contact 9a and is connected via one transistor to a second secondary side contact 9b. The transistors of the second converter circuit are controlled by the control circuit 10 to convert the alternating current that is induced to the secondary coils 4a, 4b, 4c to a direct current that is provided to the secondary side contacts 9a, 9b.

From the circuit that is depicted in FIG. 1, it can be seen that the first converter circuit 6 is connected in between the primary side 2a of the transformer 2 and the two primary side contacts 8a, 8b. The first converter circuit 6 comprises a multilevel converter, that is configured to work as a inverter when the DC/DC-converter 1 is used in a forward mode, wherein the multilevel converter is configured to receive the DC input current that is provided to the primary side contacts 8a, 8b and to provide three phases of the alternating current to the three primary coils 3a, 3b, 3c of the transformer 2, respectively.

Further than that, it can be seen that the second converter circuit 7 is connected in between the secondary side 2b of the transformer 2 and the two secondary side contacts 9a, 9b and is configured to work as a rectifier when the DC/DC-converter 1 is used in the forward mode, wherein the second converter circuit 7 is configured to receive the induced alternating current from each of the three secondary coils 4a, 4b, 4c of the transformer 2, and to provide a DC output current to the secondary side contacts 9a, 9b.

In the first embodiment, a number of n is set to be three (n=3). Thus number describes the number of legs 13a, 13b, 13c of the multilevel converter, the number of primary coils 3a, 3b 3c, the number of secondary coils 4a, 4b, 4c, the number of primary capacitors 5a, 5b, 5c and a number of legs of the second converter circuit 7.

Figure 2:
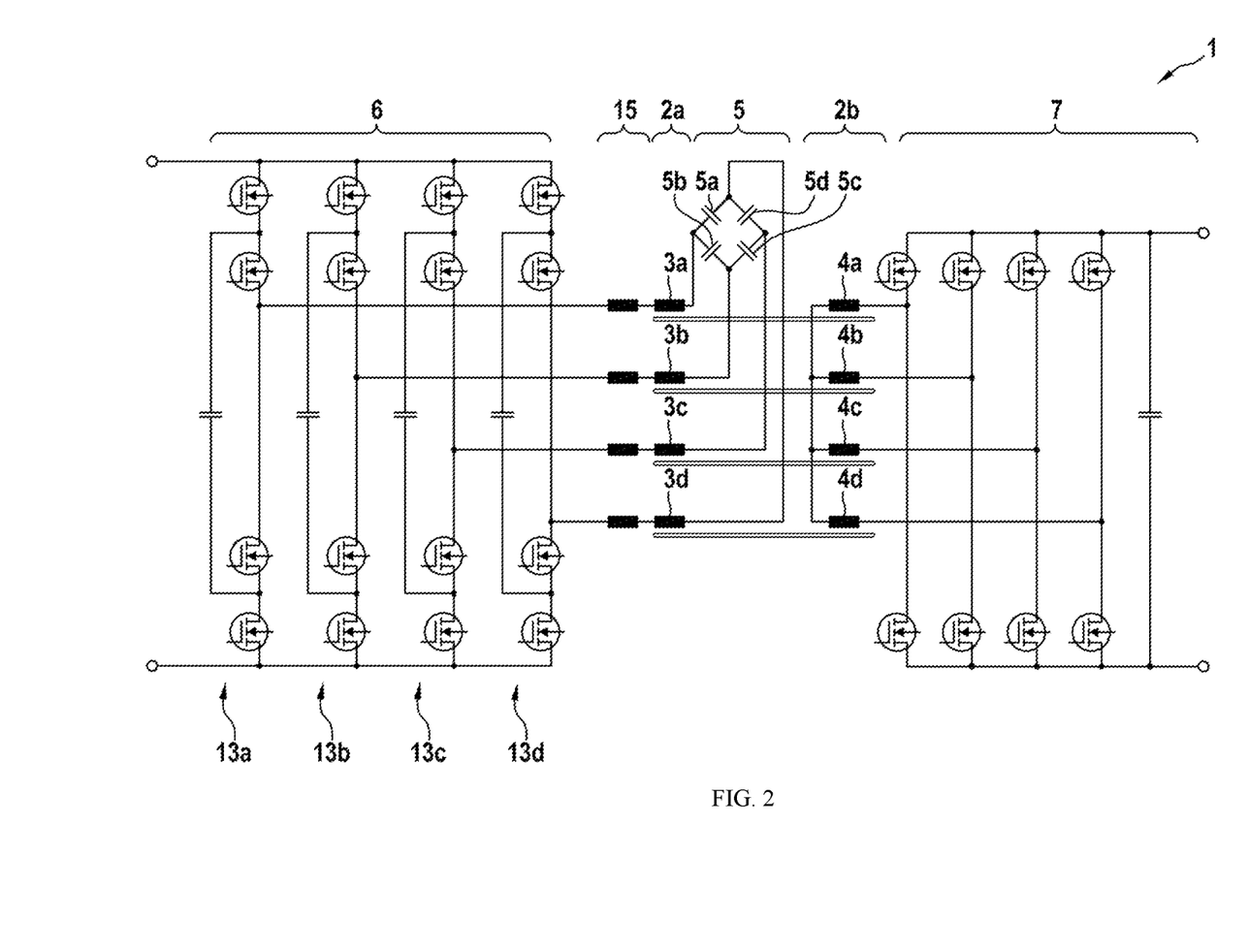

A second embodiment is depicted in FIG. 2. The embodiment essentially corresponds to the first embodiment. However, the number of n is set to be greater than three. In particular the number of n is set to be four (n=4). Accordingly, the DC/DC-converter 1 comprises a first converter circuit 6 that comprises four legs 13a, 13b, 13c, 13d, a transformer 2 that comprises four primary coils 3a, 3b 3c, 3d and four secondary coils 4a, 4b, 4c, 4d, a first polygon arrangement 5 that comprises four primary capacitors 5a, 5b, 5c, 5d and the second converter circuit 7 comprises four legs.

That is, as can be seen from FIG. 2, a fourth leg 13d is added to the first converter circuit 6, wherein the fourth leg 13d has the same layout as each one of the first to third leg 13a, 13b, 13c. The fourth leg 13d is providing a fourth phase of the alternating current to the fourth primary coil 4d. The primary coils 4a, 4b, 4c, 4d are terminated by the first polygon arrangement 5, wherein the additional fourth primary capacitor 5d is added to the ring of primary capacitors 5a, 5b, 5c, 5d.

Figure 3:
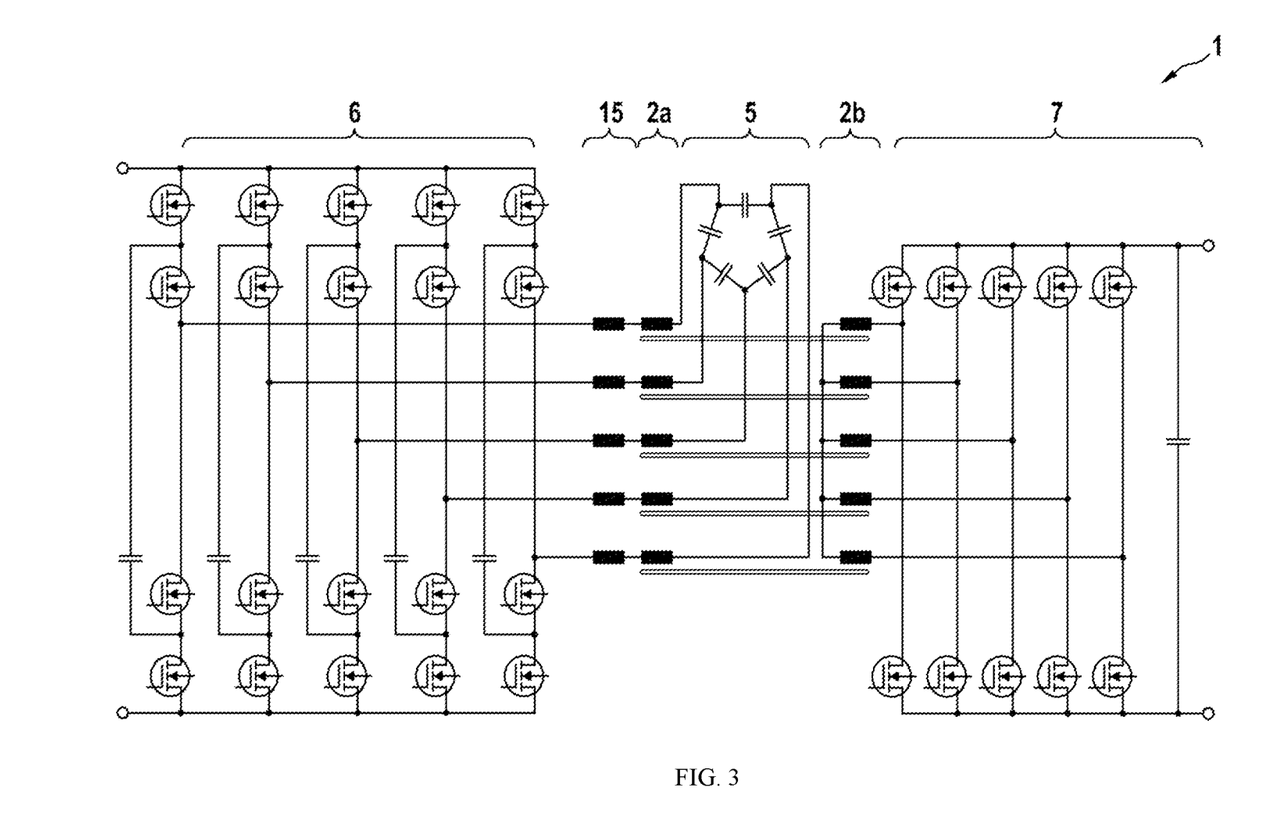

A third embodiment is depicted in FIG. 3. The embodiment essentially corresponds to the first and second embodiment. However, the number of n is set to be greater than four. In particular the number of n is set to be five (n=5). From the development of the circuits in FIGS. 1 to 3, it can be understood that a scalable circuit is provided, wherein the number of n can be set to any desired value, depending on the requirements that apply for the DC/DC-converter 1.

Figure 4:
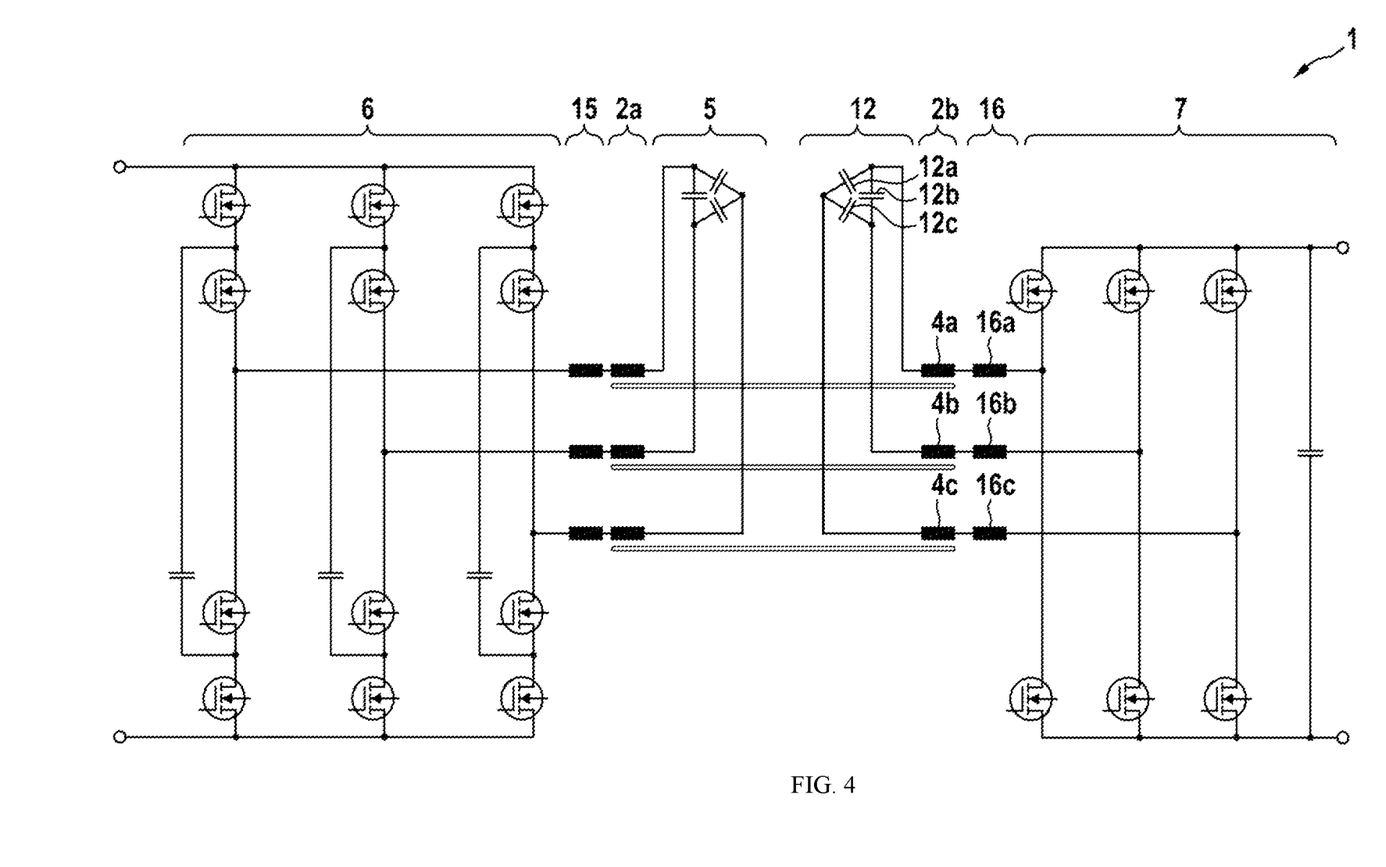

A DC/DC-converter 1 according to a fourth embodiment of the application is depicted in FIG. 4. The DC/DC-converter 1 according to a fourth embodiment essentially corresponds to the DC/DC-converter 1 according to a first embodiment. However, the DC/DC-converter 1 according to the fourth embodiment is capable to work either in a forward mode or in a backward mode.

The control circuit 10 is capable to select whether the DC/DC-converter 1 is driven in the forward mode or in the backboard mode. According to the selection, the transistors of the first converter circuit 6 and the second converter circuit 7 are switched accordingly by the control circuit 10. For the forward mode, the control circuit 10 controls the first converter circuit 6 to work as an inverter and to control the second converter circuit 7 to work as a rectifier. Therefore, the DC/DC-converter 1 is operated in a same way as the circuit that is described with FIG. 1. In the backward mode, the control circuit 10 controls the first converter circuit 6 to work as a rectifier and controls the second converter circuit 7 to work as an inverter.

Therefore, in the forward mode, a DC current that is provided as an input current to the primary side contacts 8a, 8b is converted to a different DC current that is provided as an output current to the secondary side contacts 9a, 9b. In the backward mode, a DC current that is provided as an input current to the secondary side contacts 9a, 9b is converted to a different DC current that is provided as an output current to the primary side contacts 8a, 8b. In an example, this allows that the DC/DC-converter 1 can be used to connect a chargeable battery to the secondary side contacts 9a, 9b. The battery can then be charged in the forward mode and can be discharged in the backward mode.

The secondary coils 4a, 4b, 4c are terminated by a second polygon arrangement 12. The second polygon arrangement 12 is a second resonance capacitor circuit. The second polygon arrangement 12 consists of a first secondary capacitor 12a, a second secondary capacitor 12b and a third secondary capacitor 12c. The second polygon arrangement 12 corresponds to the first polygon arrangement 5 but is terminating the secondary coils 4a, 4b, 4c instead of the primary coils 3a, 3b, 3c. Therefore, the secondary side 2b of the transformer 2 is terminated by a number of n secondary capacitors 12a, 12b, 12c, which are connected in a second polygon arrangement, each of the capacitors connecting two of the secondary coils 4a, 4b, 4c.

The DC/DC-converter 1 optionally comprises a second resonance inductor circuit 16. The second resonance inductor circuit 16 comprises a first resonance inductance 16a, a second resonance inductance 16b, and a third resonance inductance 16c. One leg of the second converter circuit 7 is connected via the first resonance inductance 16a of the second resonance inductor circuit 16 to the first secondary coil 4a. Another leg of the second converter circuit 7 is connected via the second resonance inductance 16b of the second resonance inductor circuit 16 to the second secondary coil 4b. Another leg of the second converter circuit 7 is connected via the third resonance inductance 16c of the second resonance inductor circuit 16 to the third secondary coil 4c. The secondary capacitors 12a, 12b, 12c of the second polygon arrangement 12, as a second resonance capacitor circuit, is forming a resonance circuit in combination with the resonance inductances 16a, 16b, 16c of the second resonance inductor circuit 16.

In the backward mode, the multilevel converter of the first converter circuit 6 is controlled by the control circuit 10 to work as a rectifier. In this case, the flying capacitor multilevel converter is receiving an alternating current from each the n primary coils 3a, 3b, 3c of the transformer 2 and generates a DC output current at the primary side contacts 8a, 8b. Also in the backward mode, the second converter circuit 7 is controlled by the control circuit 10 to work as a inverter. The second converter circuit 7 is receiving a DC input current from the secondary side contacts 9a, 9b and is generating an alternating current at the n secondary coils 4a, 4b, 4c of the transformer 2.

It can be seen that the circuits of FIG. 2 correspond to the circuits of FIG. 1, wherein the second polygon arrangement 12 and the second resonance inductor circuit 16 have been added to the secondary side 2b of the transformer 2, which is to improve the signal shape of the alternating current that is generated by the second converter circuit 7 in the backboard mode.

Figure 5:
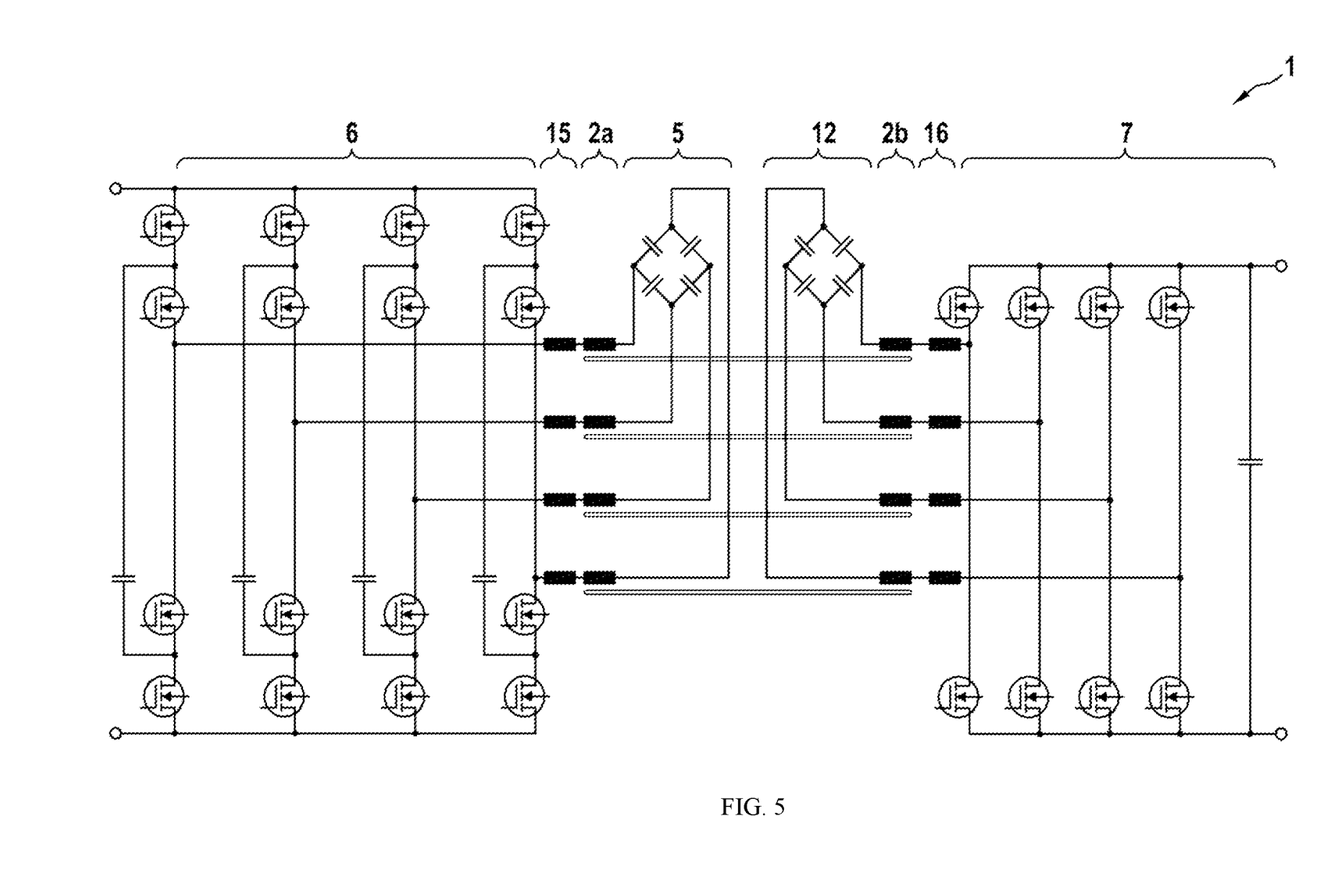
Figure 6:
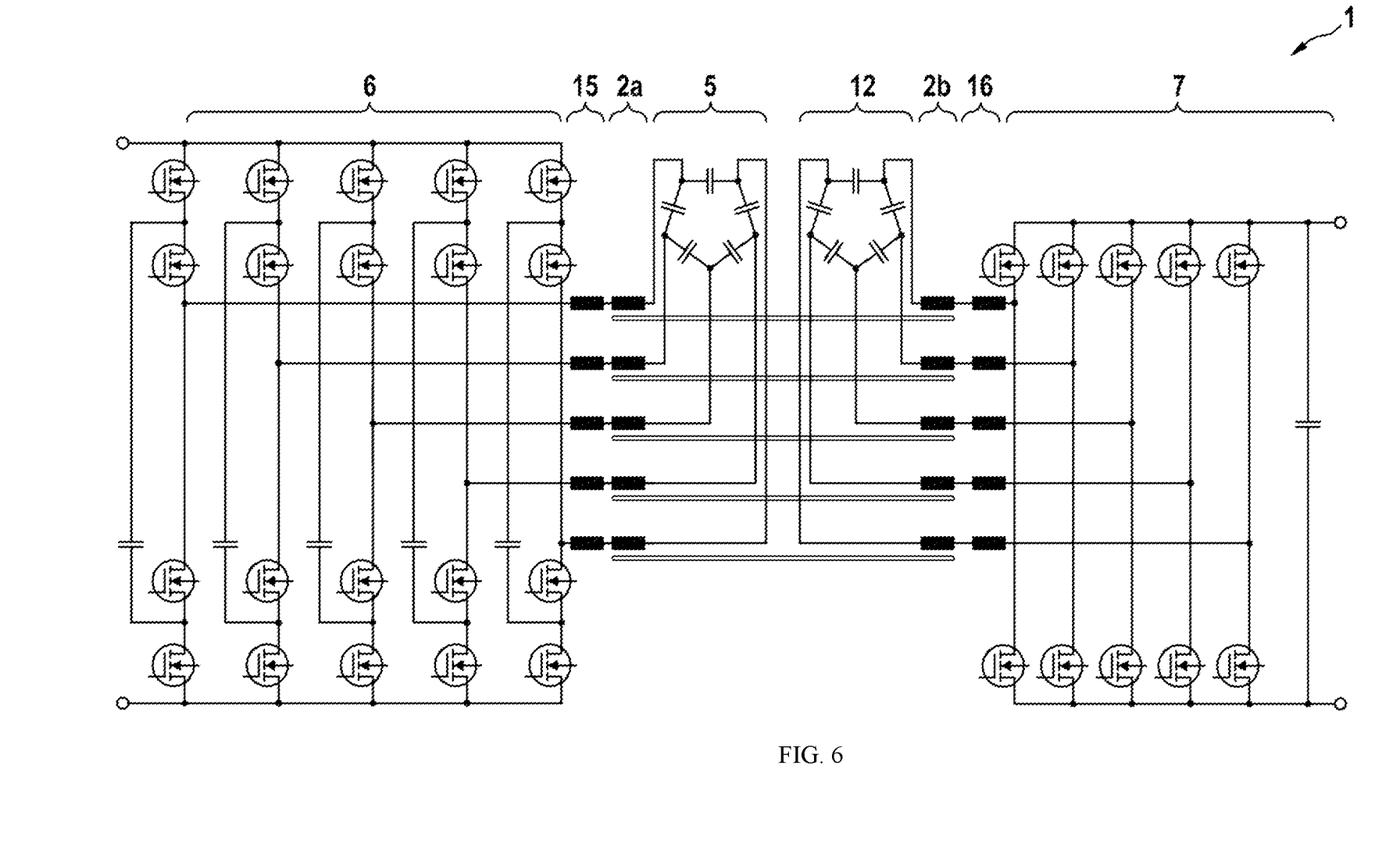

Accordingly, as depicted with a fifth embodiment in FIG. 5 and a sixth embodiment in FIG. 6, it can be seen that the DC/DC-converters of FIGS. 1 to 3 can be extended to work in the backward mode by adding the second polygon arrangement 12 and the second resonance inductor circuit 16. Also here, the number of secondary capacitors 12a, 12b, 12c and the number of resonance inductances in the second resonance inductor circuit 16 corresponds to the number of n and can be set to any desired value, wherein a circuit for n=3 is depicted in FIG. 4, a circuit for n=4 is depicted in FIG. 5, and a circuit for n=5 is depicted in FIG. 6.

For all embodiments, the second converter circuit 7 can comprises a multilevel converter, wherein the multilevel converter is in particular a flying capacitor multilevel converter. In particular, the design of the multilevel converter of the first converter circuit 6 can also be applied to the second converter circuit 7.

For all embodiments, the number of transistors per leg of the multilevel converter in the first converter circuit 6 or the second converter circuit 7 can be set to a number of 2*m, wherein the number of m can be set to any value equal or larger than 2.

In addition to the above, it is explicitly pointed to the disclosure of FIGS. 1 to 7.

What is claimed is:

1. A DC/DC-Converter, comprising:
   a transformer that comprises a primary side and a secondary side,
   wherein the primary side comprises n primary coils and the secondary side comprises n secondary coils, wherein the primary side of the transformer is terminated by n primary capacitors, which are connected in a first polygon arrangement, each of the primary capacitors connecting two of the primary coils, wherein the first polygon arrangement is a closed ring circuit in which the n primary capacitors are connected in series, wherein the secondary side of the transformer is terminated by n secondary capacitors, which are connected in a second polygon arrangement, each of the secondary capacitors connecting two of the secondary coils;
   a first converter circuit that is connected in between the primary side of the transformer and two primary side contacts, the first converter circuit comprising a first multilevel converter, that is configured to work as a inverter when the DC/DC-converter is used in a forward mode, wherein the first multilevel converter is configured to receive a DC input current that is provided to the primary side contacts and to provide n-phases of an alternating current to the n primary coils of the transformer, respectively,
   wherein the first multilevel converter comprises n legs, each leg connecting the primary side contacts and connected to one of the primary coils, wherein each of the legs comprises 2*m electrical switches being connected in series, wherein m electrical switches are provided between the respective primary coil and each one of the primary side contacts, wherein m is two, or larger than two, wherein each leg of the first multilevel converter comprises a first half-leg and a second half-leg, wherein m of the electrical switches is connected in series in each half-leg, wherein the first half-leg and the second half-leg is connected by one or more bridges, each bridge comprising a multilevel capacitor, wherein one side of the bridge is connected in between two subsequent electrical switches of the first half-leg and the other side of the bridge is connected in between two corresponding subsequent electrical switches of the second half-leg;
   a second converter circuit that is connected in between the secondary side of the transformer and two secondary side contacts and is configured to work as a rectifier when the DC/DC-converter is used in a forward mode, wherein the second converter circuit is configured to receive an alternating current from each of the n secondary coils of the transformer, and to provide a DC output current to the secondary side contacts,
   wherein the second converter circuit comprises a second multilevel converter, wherein the second multilevel converter is a flying capacitor multilevel converter, wherein the second multilevel converter comprises n legs, each leg connecting the secondary side contacts and connected to one of the secondary coils, wherein each of the legs comprises 2*i electrical switches being connected in series, wherein i electrical switches are provided between the respective secondary coil and each one of the secondary side contacts, wherein i is two, or larger than two; and
   a control circuit that is configured to control the first multilevel converter of the first converter circuit to work as the inverter in the forward mode,
   wherein n is an integer greater than or equal to 3.

2. The DC/DC-Converter according to claim 1, wherein the first multilevel converter is a flying capacitor multilevel converter.

3. The DC/DC-Converter according to claim 1, wherein the second polygon arrangement is a closed ring circuit in which the n secondary capacitors are connected in series.

4. The DC/DC-Converter according to claim 1, wherein the control circuit is configured to selectively:
   control the first converter circuit to work as the inverter and the second converter circuit to work as the rectifier in the forward mode, and
   control the first converter circuit to work as a rectifier and the second converter circuit to work as an inverter in a backward mode.

5. The DC/DC-Converter according to claim 4, wherein the first multilevel converter of the first converter circuit is further configured to work as the rectifier when the DC/DC-converter is used in the backward mode, wherein the first multilevel converter is configured to receive an alternating current from each the n primary coils of the transformer and to provide a DC output current to the primary side contacts, and
   the second converter circuit is configured to work as the inverter when the DC/DC-converter is used in the backward mode, wherein the second converter circuit is configured to receive a DC input current from the secondary side contacts and to provide an alternating current to the n secondary coils of the transformer, respectively.

6. The DC/DC-Converter according to claim 1, wherein each of the legs of the first multilevel converter provides different voltage levels to the respective primary coil for providing the alternating current in the forward mode.

7. The DC/DC-Converter according to claim 1, wherein each of the legs of the second multilevel converter rectifies an alternating current that is received from the respective secondary coil for providing a DC current in the forward mode.

8. The DC/DC-Converter according to claim 1, wherein a resonance inductor circuit is connected in between the primary coils and the first converter circuit, and in between the secondary coils and the second converter circuit, respectively.

9. The DC/DC-Converter according to claim 1, wherein a resonance inductor circuit is connected in between the primary coils and the first converter circuit.

10. The DC/DC-Converter according to claim 1, wherein a resonance inductor circuit is connected in between the secondary coils and the second converter circuit.

* * * * *